No. 746,324. PATENTED DEC. 8, 1903.
R. F. GILLIN.
FLUSHING APPARATUS.
APPLICATION FILED APR. 28, 1902. RENEWED MAY 29, 1903.
NO MODEL. 4 SHEETS—SHEET 1.
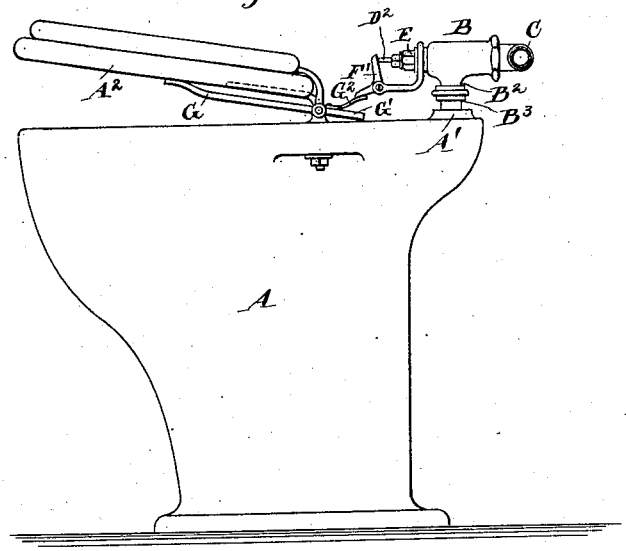
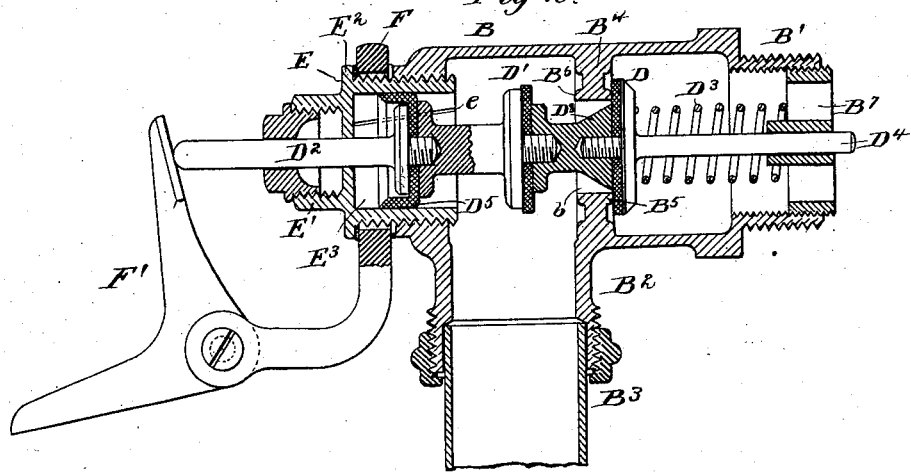
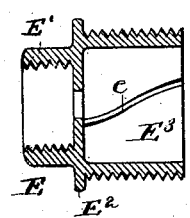
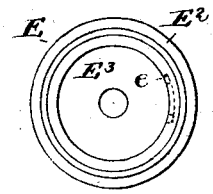
Witnesses:
George W. Case Jr.
M. E. Grace
Inventor:
Robert F. Gillin
by his attorney
Charles R. Searle No. 746,324. PATENTED DEC. 8, 1903.
R. F. GILLIN.
FLUSHING APPARATUS.
APPLICATION FILED APR. 28, 1902. RENEWED MAY 29, 1903.
NO MODEL. 4 SHEETS—SHEET 2.
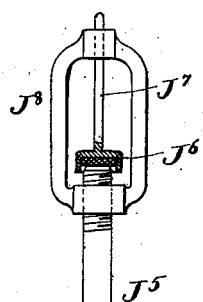
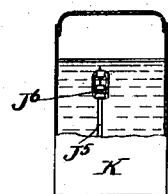
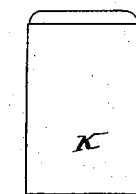
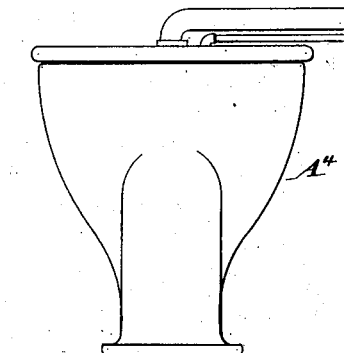
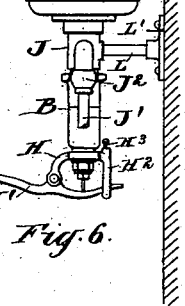
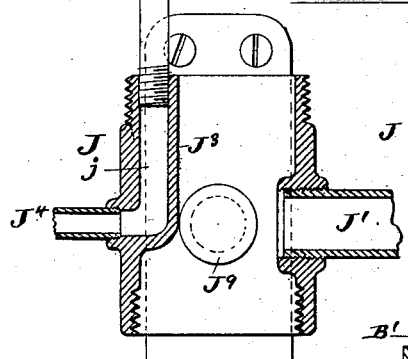
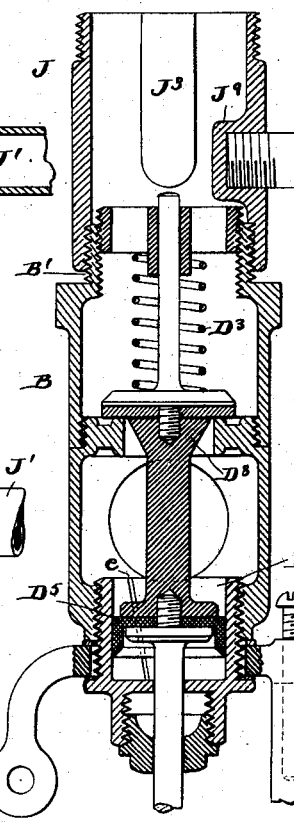
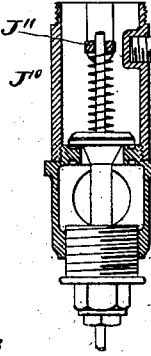
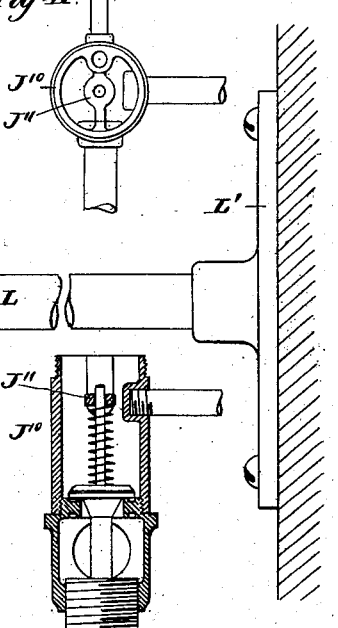
WITNESSES:
George Weaver Jr
M. E. Grace
INVENTOR
Robert F. Gillin
BY Charles R. Searle
ATTORNEY No. 746,324. PATENTED DEC. 8, 1903.
R. F. GILLIN.
FLUSHING APPARATUS.
APPLICATION FILED APR. 28, 1902. RENEWED MAY 29, 1903.
NO MODEL. 4 SHEETS—SHEET 3.
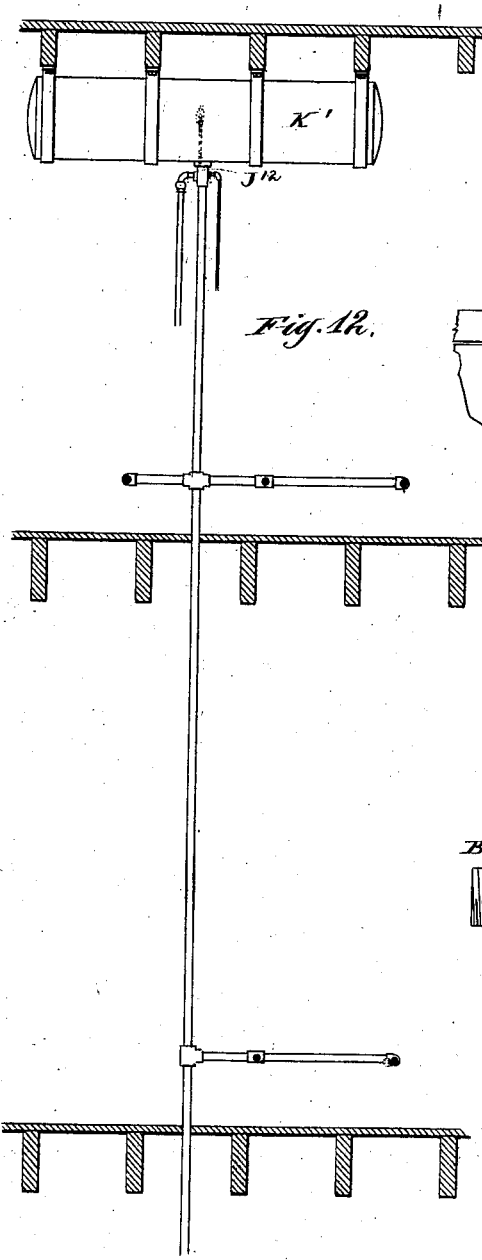
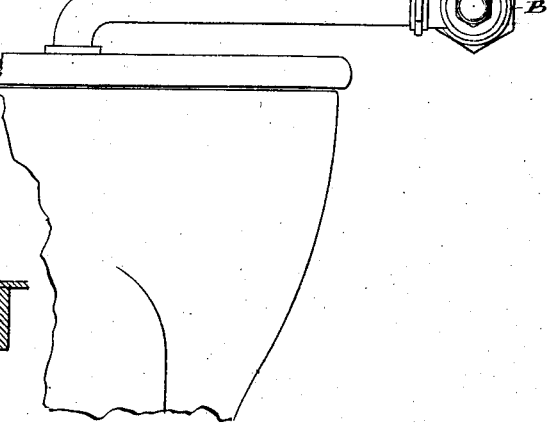
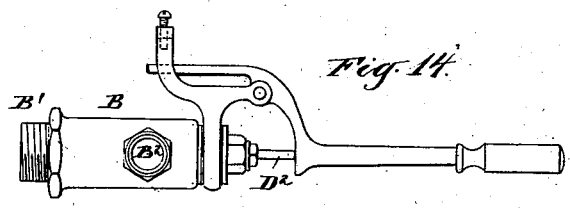
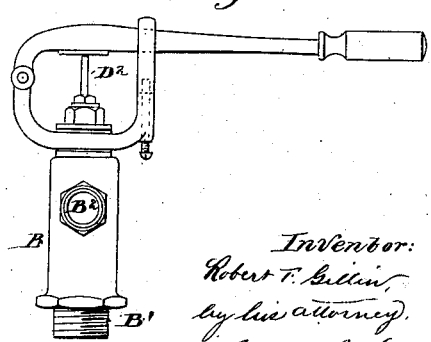

No. 746,324. PATENTED DEC. 8, 1903.
R. F. GILLIN.
FLUSHING APPARATUS.
APPLICATION FILED APR. 28, 1902. RENEWED MAY 29, 1903.
NO MODEL. 4 SHEETS—SHEET 4.
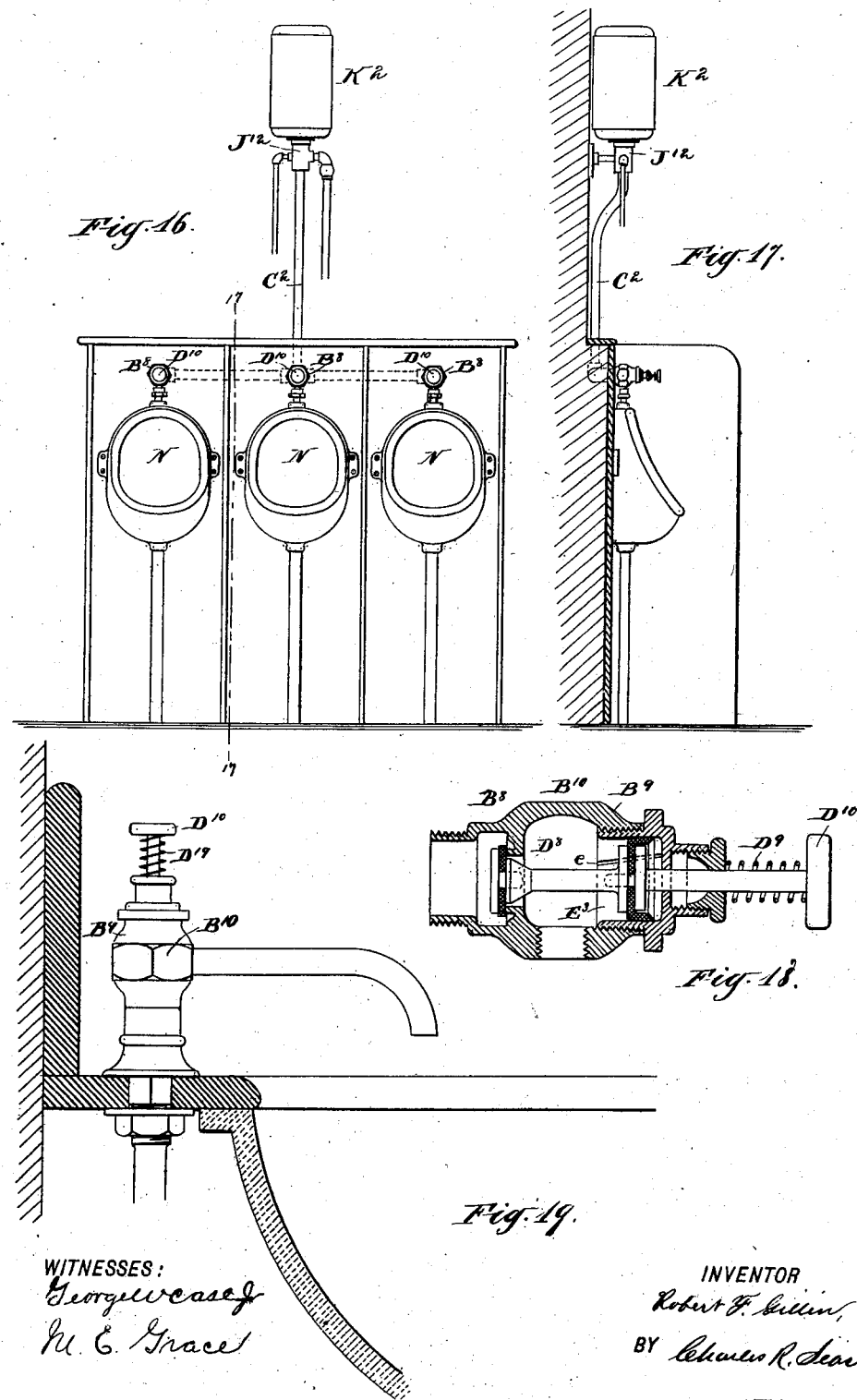

No. 746,324. Patented December 8, 1903.

UNITED STATES PATENT OFFICE.

ROBERT F. GILLIN, OF NEW YORK, N. Y.

FLUSHING APPARATUS.

SPECIFICATION forming part of Letters Patent No. 746,324, dated December 8, 1903.

Application filed April 28, 1902. Renewed May 29, 1903. Serial No. 159,370. (No model.)

*To all whom it may concern:*

Be it known that I, ROBERT F. GILLIN, a citizen of the United States, residing in the city of New York, borough of Brooklyn, in the county of Kings and State of New York, have invented a certain new and useful Improvement in Flushing Apparatus, of which the following is a specification.

The invention relates to means for supplying water under pressure to closet-bowls, urinals, and analogous apparatus, and to the construction and operation of the valve for controlling such supply.

The object of the invention is to provide simple and inexpensive apparatus, easily installed, which shall be efficient and economical in operation.

The invention consists in certain details of construction and arrangements of parts to be hereinafter described.

The accompanying drawings form a part of this specification and show the invention as I have carried it out.

Figure 1 is a side elevation of an automatic flushing-closet containing my invention. Fig. 2 is a central longitudinal section, on a larger scale, through the valve-casing shown in Fig. 1, certain portions being shown in elevation. Fig. 3 is a similar section showing a portion alone. Fig. 4 is an end view corresponding to Fig. 3. Fig. 5 is a front view, on a reduced scale, of a closet-bowl equipped with my invention as adapted to be operated by a hand-lever alongside the bowl. Fig. 6 is a side view of certain portions of the preceding figure. Fig. 7 is a vertical section, on a larger scale, through the valve-casing and its tank connection, showing certain parts in elevation. Fig. 8 is a vertical section, partly in elevation, showing the tank connection alone; and Fig. 9 is a corresponding plan view. Fig. 10 is a vertical longitudinal section corresponding to Fig. 7, but on a smaller scale, showing a preferred construction; and Fig. 11 is a corresponding plan view. Fig. 12 is a vertical section showing the manner of installing the apparatus on several floors supplied by a single elevated tank. Fig. 13 is a front view of a closet-bowl corresponding to Fig. 5, but showing the operating-valve differently connected and controlled. Fig. 14 is a corresponding side view of the valve-casing and immediately-adjacent parts. Fig. 15 is an elevation similar to the preceding figure, but showing still another mode of connecting and operating the valve. Fig. 16 is an elevation, on a smaller scale, showing a group of urinals equipped in accordance with my invention. Fig. 17 is a corresponding side elevation, partly in vertical section, the line of section being indicated by 17 17 in Fig. 16. Fig. 18 is a longitudinal section of the valve, on a larger scale, shown in the preceding figure. Fig. 19 is a vertical section through a portion of a hand-basin, showing in elevation a valve similar to that in Fig. 18, but adapted for service in supplying the basin.

Similar letters of reference indicate like parts in all the figures.

Referring to Figs. 1 and 2, in which a closet is shown operated by the depression of the seat, A is the valve-bowl, receiving its supply of water through a nipple A' at the rear, and B is a valve-casing cylindrical in form screw-threaded exteriorly at one end, B', for attachment to the supply-pipe C and having an outlet B$^2$ on one side adapted to be joined to the nipple A' by a slip-joint B$^3$ or by any suitable connection. B$^4$ is a transverse partition dividing the interior of the casing and having a central opening $b$ for the passage of water and having a valve-seat on each face surrounding the opening and marked B$^5$ and B$^6$ for the main valve D and auxiliary valve D', respectively, mounted to be moved axially within the casing by pressure upon the end of the valve-stem D$^2$. The main valve D is held normally to its seat by the water-pressure and by a spring D$^3$, abutting at one end against the rear face of the valve and at the other against a spider-frame B$^7$, adjustably mounted in the screw-threaded interior of the casing at the receiving end and serving also as a support for a rearward extension or guide D$^4$ of the valve-stem. E is a hollow cylindrical cap through which the projecting end of the valve-stem passes, equipped with a stuffing-box E' and having a flange E$^2$ serving to secure a yoke F to the casing. The interior of the cap is smoothly finished to serve as a dash-pot E$^3$, receiving a cup-leather piston D$^5$, carried on the valve-stem and serving to prevent the too-rapid seating of the main valve D. The valve is operated by a bell-crank lever F', pivoted in the end of the yoke F and having one arm in contact with the projecting end of the valve-stem and the other acted upon by an arm G' of a rocking lever G, pivotally connected to the bowl, preferably on the same hinge-rod with the seat $A^2$ and its cover and actuated by the depression of the seat.

The operation is as follows: The sinking of the seat depresses the lever G, correspondingly lifting the arm G', which acts upon the bell-crank lever F' to force the valve-stem $D^2$ against the tension of the spring $D^3$, thus forcing the main valve D from its seat and immediately thereafter seating the auxiliary valve D' on the opposite side of the partition and preventing the escape of water until the pressure is removed from the closet-seat and the parts again move toward the normal positions. When the closet-seat is allowed to rise, the spring $D^3$ forces the auxiliary valve from its seat and water from the service-pipe flows freely through the casing and nipple A' to flush the bowl. The flow continues until the main valve is again seated, the period and quantity of flow being governed by the water-pressure, the tension of the spring $D^3$, and the resistance offered by the cup-leather $D^5$.

To permit the dash-pot fluid, air, or water to escape past the cup-leather, I provide a shallow groove $e$ on the interior of the cylinder, preferably arranged spirally, as shown in Figs. 3 and 4.

$G^2$ is a leaf or plate spring attached to the lever-arm G' and serving as a cushion in transferring the pressure to the valve-stem, and thus relieving the auxiliary valve and its seat from excessive pressure. The spring should be sufficiently stiff to transfer the pressure necessary to move the valves in opposition to the spring $D^3$, but with enough elasticity to allow the closet-seat to come to rest upon the bowl when the pressure exceeds that required for such movement.

$D^8$ is a cone formed on the valve-stem adjacent to the main valve D, serving to gradually reduce the area of the opening in the partition as the valve approaches its seat, so that by the time the valve is seated the opening has been almost closed by the cone. I have found by experiment that by thus gradually closing the aperture the noise due to the hammering or chattering of the valve in coming to rest is entirely avoided and the noise due to quickly choking off the supply is also greatly diminished. The groove $e$ in the dash-pot should be of sufficient cross-sectional area to allow the valve to reach its seat in the desired time. This may be regulated by adjusting the spider-frame $B^7$ inwardly or outwardly to produce the required tension in the spring $D^3$. By arranging the groove $e$ on a slightly spiral or oblique line the danger of choking it by the formation of a corresponding ridge on the cup-leather is avoided. The movement of the cup-leather relatively to the groove also performs the important function of sweeping away any particles lodged therein, and thus automatically clears the channel at each reciprocation. Instead of a cup-leather a metallic piston may be employed, and in such case the groove may be formed on the surface of the piston, if preferred, leaving the dash-pot smooth.

The supply-pipe C may deliver water directly from the street service-pipe or other source having sufficient pressure to successfully perform the flushing operation; but I prefer to use a closed tank in which air is compressed by the water-pressure to serve in increasing the initial rush of water when the valve is opened. Such tank and its connections are shown in Figs. 5 to 11, inclusive, in which $A^4$ is a closet-bowl, and B the valve-casing, arranged with its valve-stem vertically instead of horizontally, as in the form first described, and having a yoke H, in which is mounted a hand-lever H' for operating the valve instead of the self-acting arrangement. The receiving end B' of the valve-casing is screwed into a cylindrical casting J of peculiar construction, which in turn is screwed into the lower portion of a closed tank K. The casting J receives a service-pipe J', bringing water under pressure from the street-main or other source, and is provided with a check-valve $J^2$, preventing the return of the water. In the casting J opposite to the pipe J' is a swell $J^3$, cored to provide a passage $j$, leading from an opening on the side of the casting to the upper part thereof. The side opening receives an air-pipe $J^4$, which may terminate in any convenient place where any drip may be led harmlessly away—as, for instance, within the closet-bowl—and from the upper end of the swell extends a continuation $J^5$ of the air-pipe, reaching vertically into the tank K and terminating a short distance below the water-line. Its upper end is slightly tapered to form a seat for a check-valve $J^6$, having a stem $J^7$ guided in a yoke or frame $J^8$, screwed upon the end of the pipe $J^5$, as shown. The air-valve tends to close by gravity and serves to admit air to the interior of the tank to prevent the formation of a vacuum when the main valve is opened to flush the closet and the initial pressure of the compressed air is exhausted. By locating the air-valve below the water-line its sealing is insured and the confined air is better held against escape, for the reason that if the valve be not absolutely tight the leakage will be the slow passage of water through a contracted opening instead of the rapid flow of air through a similar opening. The water thus escaping is led to the closet-bowl or other convenient place, as above described.

$J^9$ is an internal boss formed in the casting J, screw-threaded on its interior to receive the threaded end of an arm L, secured to a plate L', attached to the wall adjacent to the closet and serving as a bracket to support the casting J and its tank K.

The valve-casing in Fig. 7 is shown as in two portions screwed together and may be so constructed.

In Figs. 10 and 11 the casting $J^{10}$, corresponding to the casting J, is somewhat modified in shape to provide a guide $J^{11}$ for the valve-stem, corresponding to the spider-frame $B^7$, and is also somewhat lengthened to provide room for the valve-seating spring when used with the lower portion of Fig. 7 alone. This form may be found preferable in situations where space is contracted. It also offers the advantage of requiring less metal for the valve casing and casting.

The yoke H in Figs. 5, 6, and 7 is provided with a loop $H^2$, in which the end of the operating-lever H' is guided, and has a screw $H^3$, by which the motion of the lever may be limited and the lift of the valve correspondingly determined. In this form the auxiliary valve D' is omitted.

Fig. 12 shows an arrangement of pipes for supplying a number of closets on different floors of a building from a single elevated tank K', receiving its supply through a casting $J^{12}$ in all respects similar to the form shown in Fig. 6, excepting the omission of the bracket L. The closets on the several floors may be of the self-acting form shown in Fig. 1 or that shown in Fig. 5 or may be equipped with the valve-casing set in various relations to the supply-pipe, as may be governed by the conditions of location, and operated by hand-levers correspondingly mounted in yokes analogous to the yoke H, as indicated in Figs. 13, 14, and 15.

Figs. 16, 17, and 18 show the invention as applied in flushing urinals. In this form the tank $K^2$ and casting $J^{12}$ and their connections may be the same as in Figs. 5 and 6. The delivery-pipe $C^2$ therefrom is branched to connect to the supply-pipes to the several urinals N N, the valve-casings $B^8$ $B^8$ being connected at the point of junction. In this form of the valve-casing I provide a swell $B^9$, having facets $B^{10}$, adapted to receive a wrench, and the guide or spider frame $B^7$ and spring $D^8$ are omitted, the stuffing-box and cup-leather being alone relied on to guide the valve to its seat, aided by the cone on the valve-stem, the closing action being induced by the spring $D^9$ interposed between the stuffing-box and head $D^{10}$ on the valve-stem, tending to return the valve to its seat. The flushing operation is performed by pressing inward the head or button $D^{10}$, the duration of the flush being determined by the action of the cup-leather and the tension of the spring, as in the other forms. Fig. 19 shows a similar arrangement of valve-casing adapted for service as a basin-cock and operating in the same manner as the urinal-flush.

I claim—

1. The combination of a valve-casing having inlet and outlet openings, a transverse partition in said casing between said openings and having an aperture and a valve-seat, a valve and its stem arranged to be moved axially of said casing, a bell-crank lever carried by said casing and adapted to move said valve-stem, a closet-bowl connected to said outlet-opening, a seat-lever fulcrumed on said bowl and operated by the depression of a closet-seat supported thereon, a rearwardly-extending arm from said seat-lever, a spring carried by said arm and adapted yieldingly to transfer pressure from said arm to said bell-crank lever.

2. The combination of a valve-casing having inlet and outlet openings, a transverse partition in said casing between said openings, having an aperture therein and a valve-seat on each face, a removable hollow cylindrical cap forming a dash-pot and having a spiral groove, a valve-stem arranged axially of said casing, a main valve and an auxiliary valve carried on said stem and serving with said valve-seats, a bell-crank lever carried by said casing and adapted to move said valve-stem, a closet-bowl connected to said outlet-opening, a seat-lever fulcrumed on said bowl and operated by the depression of a closet-seat supported on said seat-lever, a rearwardly-extending arm from the latter, a spring carried by said arm and adapted yieldingly to transfer pressure therefrom to said bell-crank lever, whereby the depression of said closet-seat moves said main valve from its seat and seats said auxiliary valve, and the rise of said closet-seat allows said auxiliary valve to move from its seat and the main valve again to seat itself.

3. The combination of a valve-casing having inlet and outlet openings, a transverse partition in said casing between said openings, having an aperture therein and a valve-seat on each face, a valve-stem arranged axially of said casing, a main valve and an auxiliary valve carried on said stem and serving with said valve-seats, a cup-leather piston on said stem, a removable hollow cylindrical cap on the end of said casing and having a spiral groove and receiving said leather piston, a bell-crank lever carried by said casing and adapted to move said valve-stem, a closet-bowl connected to said outlet-opening, a seat-lever fulcrumed on said bowl and operated by the depression of a closet-seat supported on said seat-lever, a rearwardly-extending arm from the latter, a spring carried by said arm and adapted yieldingly to transfer pressure therefrom to said bell-crank lever, and a spring acting in the direction to seat said main valve, whereby the depression of said closet-seat moves said main valve from its seat and seats said auxiliary valve, and the rise of said closet-seat allows said auxiliary valve to move from its seat and the main valve to slowly seat itself in opposition to the resistance offered by said cup-leather piston and dash-pot.

4. The combination of a valve-casing and a closed tank, with an intermediately-arranged casting having a water-supply inlet and a pipe therefor, an air-passage in said casting having an air-pipe leading therefrom to a place of discharge, and a continuation of said air-pipe from said passage extending into said tank from below, a check-valve at the termination of said extension arranged to be normally submerged in the liquid in said tank, and a bracket secured to said casting and adapted to be attached to an adjacent wall.

5. In a flushing apparatus, a valve-casing, a removable casting therefor having an opening for connection with a service-pipe, an internal swell having a longitudinal passage communicating with a lateral passage having connection with an air-pipe, and an internal boss closed at its inner end, and a supporting-arm threaded into said boss, all substantially as and for the purpose specified.

In testimony that I claim the invention above set forth I affix my signature in presence of two witnesses.

ROBERT F. GILLIN.

Witnesses:
  D. C. WHEARTY,
  CHARLES R. SEARLE.